United States Patent Office 3,515,769
Patented June 2, 1970

3,515,769
POLYMERIZATION PROCESS
Norman A. Fishel, Lansing, Mich., assignor to Universal Oil Products Company, Des Plaines, Ill., a corporation of Delaware
No Drawing. Filed June 30, 1967, Ser. No. 650,205
Int. Cl. C07c 3/10
U.S. Cl. 260—683.15
9 Claims

ABSTRACT OF THE DISCLOSURE

An unsaturated organic compound is polymerized utilizing a catalyst comprising a crystalline aluminosilicate chemically combined with a metal subfluoride vapor.

DESCRIPTION OF THE INVENTION

This invention relates to a conversion process for the polymerization of an unsaturated organic compound into more useful compounds. More specifically, this invention is concerned with a conversion process for the polymerization of an unsaturated organic compound utilizing a novel catalyst comprising a crystalline aluminosilicate chemically combined with a metal subfluoride vapor.

It is therefore an object of this invention to provide a process for the polymerization of an unsaturated organic compound utilizing a novel polymerization catalyst.

A specific object of this invention is to provide a novel method and a novel catalyst for polymerizing an unsaturated organic compound to provide the desired polymerized product in high yields.

One embodiment of the invention relates to a conversion process which comprises polymerizing an unsaturated organic compound at a temperature in the range of from about 0° to about 450° C. and a pressure in the range of from about atmospheric to about 200 atmospheres in contact with a catalyst comprising a crystalline aluminosilicate chemically combined with a metal subfluoride vapor.

Other objects and embodiments referring to alternative polymerizable unsaturated organic compounds and to alternative catalytic compositions of matter will be found in the following further detailed description of the invention.

It has now been discovered that unsaturated organic compounds and particularly olefinic hydrocarbons may be converted to other and more useful compounds by contacting said olefinic hydrocarbons with certain catalytic compositions of matter which are prepared by specific methods. Examples of olefinic hydrocarbons which may be converted according to the process of this invention include monoolefins such as ethylene, propylene, 1-butene, 2-butene, 2-methyl-1-butene, 2-methyl-2-butene, 1-pentene, 2-pentene, 3-pentene, 2-methyl-1-pentene, 3-methyl-1-pentene, 2-methyl-2-pentene, 3-methyl-2-pentene, 1-hexene, 2-hexene, 3-hexene, 2-methyl-1-hexene, 3-methyl-1-hexene, 4-methyl-1-hexene, 2-methyl-2-hexene, 3-methyl-2-hexene, 4-methyl-2-hexene, 2-methyl-3-hexene, 3-methyl-3-hexene, 1-heptene, 2-heptene, 3-heptene, 3-methyl-1-heptene, 3-methyl-1-heptene, 4-methyl-1-heptene, 2-methyl-2-heptene, 3-methyl-2-heptene, etc. and mixtures thereof; polyolefins such as 1,3-butadiene, 2-methyl-1,3-butadiene, 1,3-pentadiene, 2-methyl-1,3-pentadiene, 1,4-pentadiene, 2-methyl-1,4-pentadiene, 1,3-hexadiene, 1,4-hexadiene, 2-methyl-1,3-hexadiene, etc. and mixtures thereof; and cycloolefins such as cyclopentene, cyclohexene, cycloheptene, etc. and mixtures thereof.

As hereinbefore set forth, the invention is concerned with a conversion process for the polymerization of unsaturated organic compounds, said process being effected in the presence of a catalyst which possesses a high degree of hydrocarbon conversion activity and is particularly effective as a polymerization catalyst for the unsaturated organic compounds hereinabove set forth. The catalyst comprises a crystalline aluminosilicate chemically combined with a metal subfluoride vapor. The crystalline aluminosilicates are composed of $SiO_4$ and $AlO_4$ tetrahedra, a silicon or aluminum atom being centered around four oxygen atoms in the tetrahedra and the oxygen being shared with other surrounding tetrahedra. These aluminosilicates are geometrically arranged to form a pore structure having sufficiently large pore size to permit the reactant molecules to pass into said pore structure. Preferably, the aluminosilicates employed in the catalyst support have pore sizes of from about 4 up to about 15 angstroms in cross-sectional diameter. The aluminosilicates are treated to improve their catalytic activity by techniques such as ion-exchange with suitable cations and thermal treatment. Ordinarily, the aluminosilicates are synthetically prepared in the alkali metal form (usually sodium) and there is one monovalent alkali metal cation associated with each aluminum centered tetrahedra (to maintain electrical neutrality). The aluminosilicates may be ion-exchanged with polyvalent cations such as calcium, magnesium, beryllium, rare earths, etc., to replace a substantial amount of the monovalent cations. This causes one polyvalent cation to be associated with more than one aluminum centered tetrahedra and if these tetrahedra are spread sufficiently far apart (due to the presence of silicon centered tetrahedra), areas of local electrical charge will be formed which aid in promoting catalytic reactions. Another treating technique to improve the catalytic activity of the aluminosilicates is to ion-exchange with ammonium ions followed by thermal treatment, preferably about 300° C. to convert the crystalline aluminosilicates to the hydrogen form.

There are numerous types of crystalline aluminosilicates, both synthetic and natural occurring. It is preferable that the pore mouths of the crystalline aluminosilicates have cross-sectional diameters of from about 4 to 15 angstrom units. Among the preferable crystalline aluminosilicates that are suitable are the hydrogen and/or polyvalent forms of faujasite, and mordenite, and especially preferable is the hydrogen form of mordenite. The concentration of crystalline aluminosilicate may be as high as 100% or the crystalline aluminosilicate may be held within a matrix which may be selected from the group consisting of silica, alumina, and silica-alumina mixtures.

As set forth hereinabove, the catalyst comprises a crystalline aluminosilicate that is combined with a metal subfluoride vapor to effect combination of the crystalline aluminosilicate with the metal subfluoride. Particularly preferred metal subfluorodies include the aluminum subfluorides including aluminum monofluoride and silicon subfluorides including silicon diflouride due mainly to the relative ease in preparing these compounds although the invention is not restricted to their use but may employ any of the known metal subfluorides insofar as they are adaptable. However, it is not intended to infer that different metal subfluorides which may be employed will produce catalysts which have identical effects upon any given organic reaction as each of the catalysts produced from different metal subfluorides and by slightly varying procedures will exert its own characteristic action.

The catalyst of the present invention comprises a crystalline aluminosilicate combined with the metal subfluoride vapor so as to effect combination of the crystalline aluminosilicate with the metal subfluoride vapor and it is the particular association of these components which results in the unusual catalytic properties of this catalyst. The metal subfluoride vapor may be combined with the crystalline aluminosilicate at temperatures in the range of 650° C. to about 1000° C. and at a pressure of from about subatmospheric to about 10 atmospheres. The formation of the metal subfluoride vapor, and especially the formation of aluminum monofluoride is accomplished by sweeping with a gas such as helium, argon or hydrogen, and preferably helium, a stoichiometric mixture of aluminum metal (melting point about 660° C.) and aluminum trifluoride (melting point greater than 1000° C.) which is heated to about 750 to 850° C. The crystalline aluminosilicate which is then chemically combined with the aluminum monofluoride is placed in the down-stream helium flow. The chemical combination takes place at temperatures in excess of 650° C. Fluoride concentrations of between 0.01 percent to about 5 percent (by weight) are preferred.

In an alternative method, the catalyst may be prepared by pelleting a mixture of aluminum powder with a stoichiometric excess of aluminum trifluoride, and mixing these pellets with the crystalline aluminosilicate catalyst support and then heating a vacuum in a furnace tube at elevated temperatures.

The process of this invention utilizing the catalyst hereinbefore set forth may be effected in any suitable manner and may comprise either a batch or a continuous type operation. The preferred method by which the process of this invention may be effected is a continuous type operation. One particular method is the fixed bed operation in which the unsaturated organic compound is continuously charged to a reaction zone containing a fixed bed of the desired catalyst, said zone being maintained at the proper operating conditions of temperature and pressure, that is, a temperature in the range of from about 0° to about 450° C. or more and a pressure including a pressure of from about atmospheric to about 200 atmospheres or more. The catalyst is suitable for either gas phase or liquid phase reactions so that the liquid hourly space velocity (the volume of charge per volume of catalyst per hour) may be maintained in the reaction zone in the range of from about 0.1 to about 20 or more, preferably in the range of from about 0.1 to about 10, or at a gaseous hourly space velocity in the range of from about 100 to about 1500 or more. The reaction zone may comprise an unpacked vessel or coil or may be lined with an adsorbent packing material. The charge passes through the catalyst bed in an upward, downward, or radial flow and the polymerized product is continuously withdrawn, separated from the reactor effluent, and recovered, while any unreacted starting materials may be recycled to form a portion of the feed stock. It is also contemplated within the scope of this invention that gases such as hydrogen, helium, nitrogen, argon, etc. may also be charged to the reaction zone if desired. Another continuous type operation comprises the moving bed type in which the unsaturated organic compound and the catalyst bed move either concurrently or countercurrently to each other while passing through said reaction zone.

Still another type of operation which may be used is the batch type operation in which a quantity of the unsaturated organic compound and the catalyst are placed in an appropriate apparatus such as, for example, a rotating or stirred autoclave. The apparatus is then heated to the desired temperature and maintained thereat for a predetermined residence time at the end of which time the flask and contents thereof are cooled to room temperature and the desired reaction product is recovered by conventional means, such as, for example, by washing, drying, fractional distillation, crystallization, etc.

The following examples are introduced for the purpose of illustration only with no intention of unduly limiting the generally broad scope of the present invention.

EXAMPLE I

A quartz vessel with provisions for connection to a vacuum system was filled with a mixture of about 94 grams of a 5 A. crystalline aluminosilicate having a 2:1 silica to alumina mol ratio and about 26 grams of ⅛ inch pellets comprising about 20% aluminum metal and about 80% aluminum trifluoride by weight. The contents of the vessel were outgassed at a pressure of less than $10^{-4}$ mm. while slowly being heated in a tube furnace. Approximately 4½ hours are allowed for the system to reach 600 to about 650° C. The evacuated vessel was then sealed off. The vessel was then placed in a muffle furnace at 750° C. for 1 hour and rotating slowly to aid mixing.

The sealed vessel was cooled to room temperature. After cooling, the vessel was opened in a helium dry box, the somewhat greyish catalyst spheres were separated from the pellets and the catalyst was then placed in vessels which were then sealed. This catalyst is designated as catalyst "A."

EXAMPLE II

In this example, a volatile fluoride (800° C.) is prepared by sweeping with helium a stoichiometric mixture of aluminum metal (melting point 660° C.) and aluminum trifluoride (melting point greater than 1000° C.) which is heated to 750–800° C. Aluminum monofluoride is then produced. A catalyst base in the form of hydrogen form faujasite ⅛ inch diameter pills is then placed in the downstream helium flow and the aluminum monofluoride is chemically combined with the base at a temperature in excess of 650° C.

The catalyst produced by this vapor deposition and chemical combination of the aluminum monofluoride with the hydrogen form faujasite has fluoride levels of less than 5 percent by weight fluoride chemically combined therewith. This catalyst is designated as catalyst "B."

EXAMPLE III

A volatile fluoride (800° C.) is prepared by sweeping with helium a stoichiometric mixture of aluminum metal (melting point 660° C.) and aluminum trifluoride (melting point greater than 1000° C.) which is heated to 750–800° C. Aluminum monofluoride is then produced. A catalyst base in the form of hydrogen form mordenite ⅟₁₆ inch diameter spheres are prepared and placed in the downstream helium flow and the aluminum monofluoride is chemically combined with the base at a temperature in excess of 650° C.

The catalyst produced by this vapor deposition and chemical combination of the aluminum monofluoride with the hydrogen form mordenite has fluoride levels of less than 5 weight percent of fluoride chemically combined therewith. This catalyst is designated as catalyst "C."

EXAMPLE IV

The catalyst prepared according to Example I above and designated as catalyst "A" is utilized in a polymerization reaction zone to determine the polymerization activity of said catalyst. In this experiment, a portion of the catalyst prepared according to the method of Example I is placed in the reaction zone which is provided with heating means. In the experiment, a 1:1 molar propane-propylene mixture is charged to the polymerization reactor. The reactor is maintained at about 500 p.s.i.g. and about 350°. Substantial olefin conversion is obtained. The liquid product is analyzed using gas-liquid chromatography and it is found that the product comprises propylene trimer, propylene tetramer, and intermediate and higher cuts.

EXAMPLE V

The catalyst prepared according to Example II and designated as catalyst "B" is utilized in a polymerization reaction zone, a portion of the finished catalyst being placed in the polymerization apparatus. In the experiment, 1:1 molar butylene-butane feed mixture is charged to the polymerization zone which is maintained at about 370° C. and at about 500 p.s.i.g. pressure. Substantial conversion of the olefin is obtained, the product comprising mainly octenes with small amounts of higher polymers.

EXAMPLE VI

In this example, a portion of catalyst "C" is utilized in the polymerization of cyclohexene. In this experiment, the catalyst is placed in the polymerization apparatus. Cyclohexene is charged to the polymerization reactor which is maintained at about 600 p.s.i.g. and about 350° C. Substantial olefin conversion is obtained.

I claim as my invention:

1. A conversion process which comprises a polymerizing an olefinic hydrocarbon at a temperature in the range of from about 0° to about 450° C. and at a pressure in the range of from about atmospheric to about 200 atmospheres in contact with a catalyst consisting essentially of a crystalline aluminosilicate chemically combined with a fluoride selected from the group consisting of aluminum subfluoride vapor and silicon subfluoride vapor at a temperature of from about 650° C. to about 1000° C.

2. The process of claim 1 further characterized in that said fluoride is aluminum monofluoride and that said crystalline aluminosilicate contains silica and alumina tetrahedra having uniform pores of between 4 and 15 angstroms.

3. The process of claim 2 further characterized in that said silica and alumina tetrahedra having uniform pores of between 4 and 15 angstroms are suspended in an alumina matrix.

4. The process of claim 2 further characterized in that said silica and alumina tetrahedra having uniform pores of between 4 and 15 angstroms are suspended in a silica matrix.

5. The process of claim 2 further characterized in that said silica and alumina tetrahedra having uniform pores of between 4 and 15 angstroms are suspended in a silica-alumina matrix.

6. The process of claim 2 further characterized in that said crystalline aluminosilicate is the hydrogen form of faujasite.

7. The process of claim 2 further characterized in that said crystalline aluminosilicate is the hydrogen form of mordenite.

8. The process of claim 1 further characterized in that said olefinic hydrocarbon is propylene.

9. The process of claim 1 further characterized in that said olefinic hydrocarbon is butene-1.

References Cited

UNITED STATES PATENTS

| | | | |
|---|---|---|---|
| 3,104,270 | 9/1963 | Mattox et al. | 260—683.15 |
| 3,178,365 | 4/1965 | Miale | 260—683.15 X |
| 3,236,762 | 2/1966 | Rabo et al. | 260—683.15 X |
| 3,322,848 | 5/1967 | Garwood et al. | 260—683.15 |
| 3,325,465 | 6/1967 | Jones et al. | 260—683.15 X |
| 3,426,089 | 2/1969 | De Rosset | 260—683.15 X |
| 3,428,704 | 2/1969 | Fishel | 260—683.2 |

PAUL M. COUGHLAN, JR., Primary Examiner

U.S. Cl. X.R.

260—666